United States Patent [19]
Levine

[11] Patent Number: 5,191,440
[45] Date of Patent: Mar. 2, 1993

[54] MULTIPLE PHOTOCOPIER SYSTEM WITH MEMORY AND COMPOSITE PROCESSING

[76] Inventor: Alfred B. Levine, P.O. Box 34-1738, Bethesda, Md. 20827

[21] Appl. No.: 500,879

[22] Filed: Mar. 29, 1990

[51] Int. Cl.⁵ .............................................. H04N 1/40
[52] U.S. Cl. .................................... 358/450; 358/448; 358/452
[58] Field of Search .............. 358/450, 451, 452, 453, 358/448, 401, 403, 404

[56] References Cited

U.S. PATENT DOCUMENTS

| | | | |
|---|---|---|---|
| 4,342,052 | 7/1982 | Rackley et al. | 358/451 |
| 4,538,183 | 8/1985 | Kanno et al. | 358/451 |
| 4,641,197 | 2/1987 | Miyagi | 358/450 |
| 4,655,577 | 4/1987 | Ikuta | 355/202 |
| 4,751,583 | 6/1988 | Levine | 358/452 |

FOREIGN PATENT DOCUMENTS 57-61372A  4/1982  Japan .................................... 358/450

Primary Examiner—Edward L. Coles, Sr.
Assistant Examiner—Thomas D. Lee

[57] ABSTRACT

A photocopier system for combining plural image segments taken from a series of different documents and printing the series of image segments as a composite image on a common copy sheet, in a side-by-side format, each contiguous to the others. Each image segment is read by the photocopier and stored by a memory medium, that be detachable from the photocopier and portable, to be used with other photocopiers at different times or places. The stored image segments can be selectively edited, enlarged, reduced, as desired, or to conform with the spatial requirements of a copy sheet. A visual display previewer is provided together with controls, for editing and manipulation of the image segments or the composite image. The photocopier system can be provided with different outputting devices for selectively recording and/or printing, in different modes, to provide a more versatile copier for use by researchers and others.

12 Claims, 2 Drawing Sheets

MULTIPLE PHOTOCOPIER SYSTEM WITH MEMORY AND COMPOSITE PROCESSING

STATEMENT OF INVENTION

This invention generally relates to improvements in photocopiers, and more particularly to photocopiers for combining multiple segments from different documents on a common print-out sheet.

BACKGROUND AND PRIOR ART

Originally photocopiers were developed to make single copies of entire documents. In recent years, more advanced photocopiers have been introduced, to make copies of portions of documents, as well as to make composite copies, by combining two pages of documents on a single printout sheet, such as copying two adjoining pages in a book or pamphlet.

However, quite often many users, including writers, technical researchers, and others, desire to copy portions, or exerpts, from a series of different documents, and combine such multiple exerpts in a common file. Such users generally copy the entire pages containing such exerpts, and clip out and retain the desired portions and discard the remainder of the copy sheets. To save space in the files, and to facilitate handling and viewing of the clipped out segments, the users also generally glue or tape the clipped segments on one or more single sheets, in a side-by-side arrangement, and store such composite sheets in the file. These procedures for gathering and combining the multiple segments or exerpts from the many documents involved is quite often very time consuming and very wasteful of paper, since quite often a major portion of the many copy sheets are discarded to retain only a small segment of the sheet containing the desired exerpt.

SUMMARY OF THE INVENTION

According to the present invention, there is provided a photocopier having masking to select and read only the desired segment or exerpt from each one of the series of different original documents, and generate a video image corresponding to such selected exerpt. The series of video images being generated are stored in a memory medium associated with the photocopier, instead of promptly printing each of the images as is customary. At the convenience of the user, one or more of the stored video images is readout from the memory and printed to provide a copy thereof. Where a series of such exerpts, or segments, is selected to be printed, they are printed in a combined manner on a common copy sheet, in a selected side-by-side arrangement. In this manner, the need for individually clipping out each of the desired segments or exerpts, from the different copies and glueing or taping these together on in a composite manner on a common sheet, is avoided.

According to further features of the invention, the memory medium for storing the series of different video images is detachable, in the form of a magnetic floppy disc or cassette, or other medium, to enable a user to employ this removable medium with a plurality of different photocopiers, or at the same or at different locations and libraries, and at different times, thereby to collect and retain a plurality of different exerpts or segments from different documents, and retain the video images therof in the storage medium.

Still additional features of the invention include a visual display and electronic editor associated with the photocopier. This enables a researcher, or other user, to preview any one or more of the series of stored video images from the different original documents, and to edit or manipulate each of these images, as well as to arrange the different ones of the images on a common sheet to provide a desired arrangement of the composite image on the sheet.

Still additional features of the invention comprise manual, or automatic, enlargement or reduction of each different video image to be printed, to correspond with designated spatial areas on a copy sheet to receive such image. Still others include centering of each such image within such spatial area. These features enable a user to efficiently combine and print a number of such exerpts or segments on a common sheet, commenserate with the size of the copy sheet.

These and still further features of the invention are disclosed in the following detailed description of preferred embodiments of the invention, set forth hereafter.

DETAILED DESCRIPTION OF PREFERRED EMBODIMENTS

Figure 1:
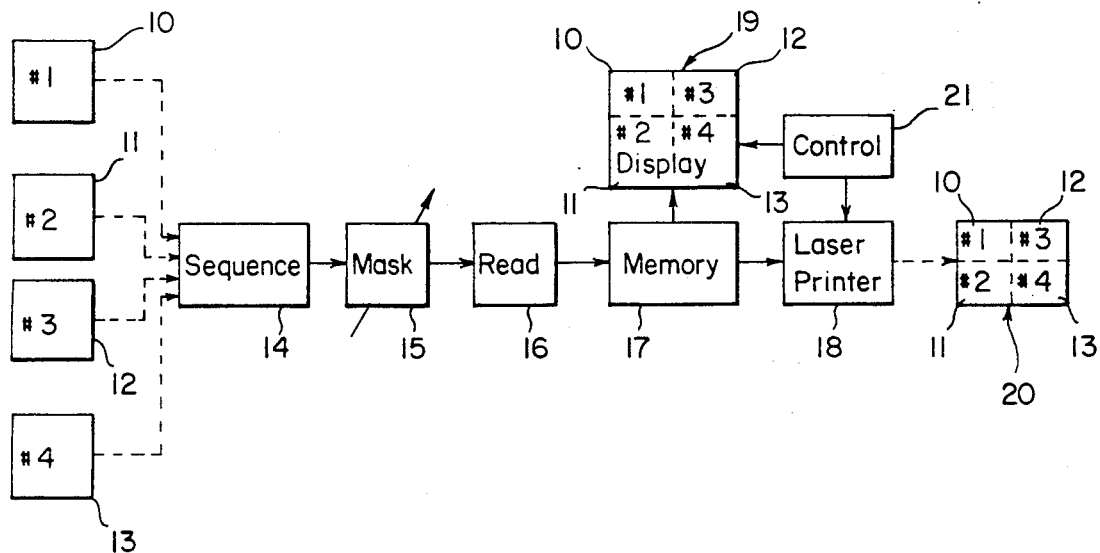
FIG. 1 is a simplified diagram illustrating the the essential components of one preferred embodiment of the invention.

Referring to the drawings, there is shown in FIG. 1, the components of a preferred photocopier for electronically combining a series of different image segments, or image exerpts, as a composite image of all such segments on a common copy sheet. As shown, each one of the series of different original documents 10, 11, 12, and 13, having portions to be copied, are sequentially applied to the reader or scanner 16 of the photocopier and an electrical video image thereof is obtained and stored in the memory medium 17. Each such video image may be read out of memory 17 and visually previewed on a display screen 19, and/or may be applied to modulate a laser printer 18 to provide a hard printed copy thereof. Additionally, all of the series of different image segments can be read out of memory 17 and printed as a composite image, with the different images being printed in side-by-side arrangement on the common copy sheet.

According to a preferred embodiment, each one of the series of original documents 10, 11, 12, and 13, is individually masked by adjustable masking unit 15, to select a desired image portion, segment, or image exerpt, from that document, that it is desired to retain. The selected segment from each document is sequentially stored in the memory medium 17, having sufficient storage capacity to retain a number of different image segments, such as the four segments 1,2,3, and 4 as depicted on the document 20 in FIG. 1. When it is desired to print a composite copy of all image segments, the memory medium 17 is read out to sequentially modulate a laser printer 18, whose format is controlled by control 21. to print each different one of the image segments in a different quadrant on the same copy sheet 20, as shown by the areas designated by numbers 10, 11, 12, and 13 in FIG.1. Thus according to the invention, a series of different documents are each read, or scanned, in sequence, and each document is adjustably masked to select a segment of the image on the document, and such selected image segment is entered and stored in a memory medium, where it can be read out, and displayed and/or printed, as a composite image, at the convenience of a user. Both the printer and/or the visual display are modulated, and are format controlled, to present the different image segments in a side-by-side contiguous arrangement in the composite image, as shown by FIG. 1.

Figure 2:
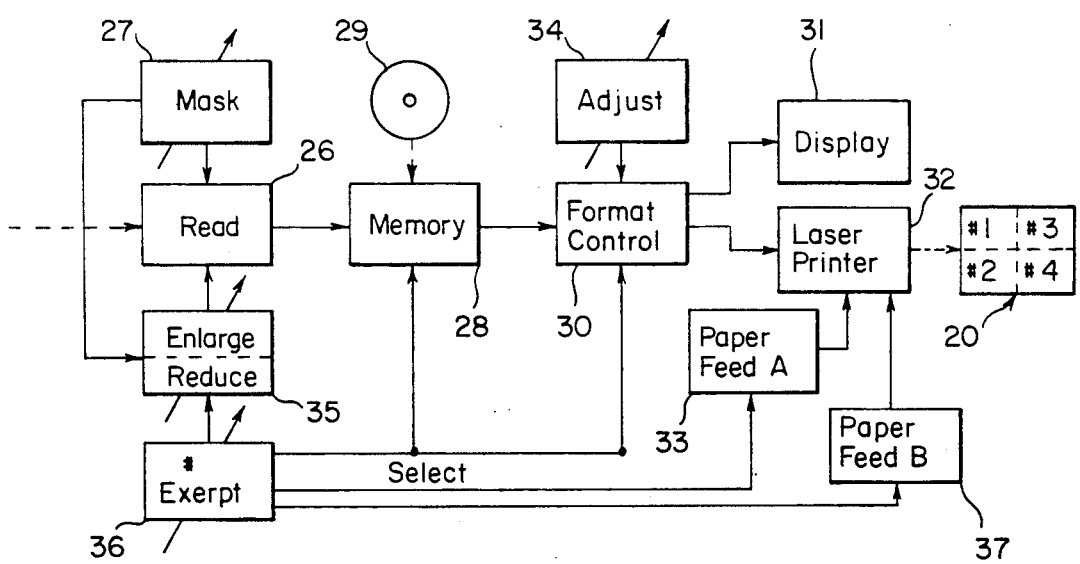
FIG. 2 is a block diagram, similar to FIG. 1, and showing additional features and functions of the preferred embodiment.

FIG. 2 shows additional components and functions of the present invention to more efficiently produce the composite document, consisting of the series of selected image segments from the different documents.

Since each different image segment is adapted to occupy a given spatial area, or quadrant, of the copy sheet, it is desired to adjustably enlarge or reduce that image segment as required to best occupy its designated partial area. This is performed by coupling the adjustable masking means 27 to the adjustable optical system 35 of the scanner or reader 2, to adjustably change the degree of enlargement or reduction of the image segment to conform with the available space. Thus where the selected image segment to be retained contains a greater portion of the original document, this larger image segment is reduced in size at the scanner 25 to fit the available space in the designated quadrant whereas if the image segment is smaller, it is enlarged to fit the available space.

It is also often desired to adjustably increase the number of different image segments to be combined on the output copy sheet, where, for example, each segment may be only a short clipping from a publication. Similarly, it may also be desired to reduce the number of image segments on the copy sheet where each such segment is a longer printed passage, or a more detailed drawing or other image. To perform this adjustment, the present invention includes an adjustable format, or exerpt, control 36, as shown in FIG. 2.

In FIG. 2, the adjustable format control 36 is interconnected with the laser printer 32 internal program 30 and to the visual previewing screen display 31, to control the format of printing on the copy sheet 20, to subdivide the area of the sheet 20 into the selected number of equally sized areas. Similarly, it is connected to the scan control circuits for the visual display 31, to control the format of the visual display on the screen 31 to correspond to that of the copy sheet 20. These controls are effected through the format circuits 30 interconnecting the memory 28 and the laser printer 32 and display 31. The adjustable exerpt and format circuits 36, 30 also interconnect to the interrogation for the memory 28, to correspondingly read out a different number of image segments, each to be printed, and displayed, in the different ones of the quadrants that are selected by the user. Thus, for example, where a user adjusts the circuit 36 to combine (6) image segments on a common copy sheet 20, then the printing format of the laser printer 32 is modulated to subdivide the copy sheet into six (6) contiguous quadrants, or six equal areas, and the scanning control format circuitry for the visual display 31 is similarly adjusted. Additionally, the interrogation circuitry for the memory 28 is correspondingly controlled to sequentially read out six (6) different image segments stored in the memory 28, to be printed in contiguous arrangement on the copy sheet 20, and similarly displayed on the screen of the display 31.

According to the invention, there is also provided a series of sheet feeders 33 and 37 for selectively feeding copy sheets of different length to the laser printer 32. The adjustable selector controls for enabling the user to select different paper size, is incorporated with the format control circuitry 36, thereby to change the format of printing for each different size of copy sheet that is selected. Thus, for example, where the user selects a larger longer) copy sheet, the format control for the laser printer 32 is correspondingly adjusted, or changed, to subdivide the longer sheet into quadrants of equal size, as before, by proportionally enlarging the size of each spatial quadrant. The laser printer 32 is also properly modulated by these circuits to properly print each of the image segments centrally within the revised spatial quadrants. For example, where a user may wish to combine five or more different image segments on a common copy sheet, it is preferred to use a larger copy sheet size to accomodate the greater number of image segments in the composite copy. This is performed by the user selecting a different one of the paper feeds 33, 37, and having the circuitry conjointly vary the format and modulation of the laser printer 32 to correspond with the different paper size. In a similar manner, the format control circuit 30 and adjustment circuits 36 are coupled to the circuitry governing the previewing display 31, thereby to display the changed format of selected multiple image segments on the display screen 31. Thus, the user can not only select the number of different images segments to be combined in the composite image on the copy sheet, but can also select the size of the copy sheet and have such images segments printed within equal spatial areas on said sheet, and be enlarged or reduced to correspond with the size of the spatial areas.

Figure 3:
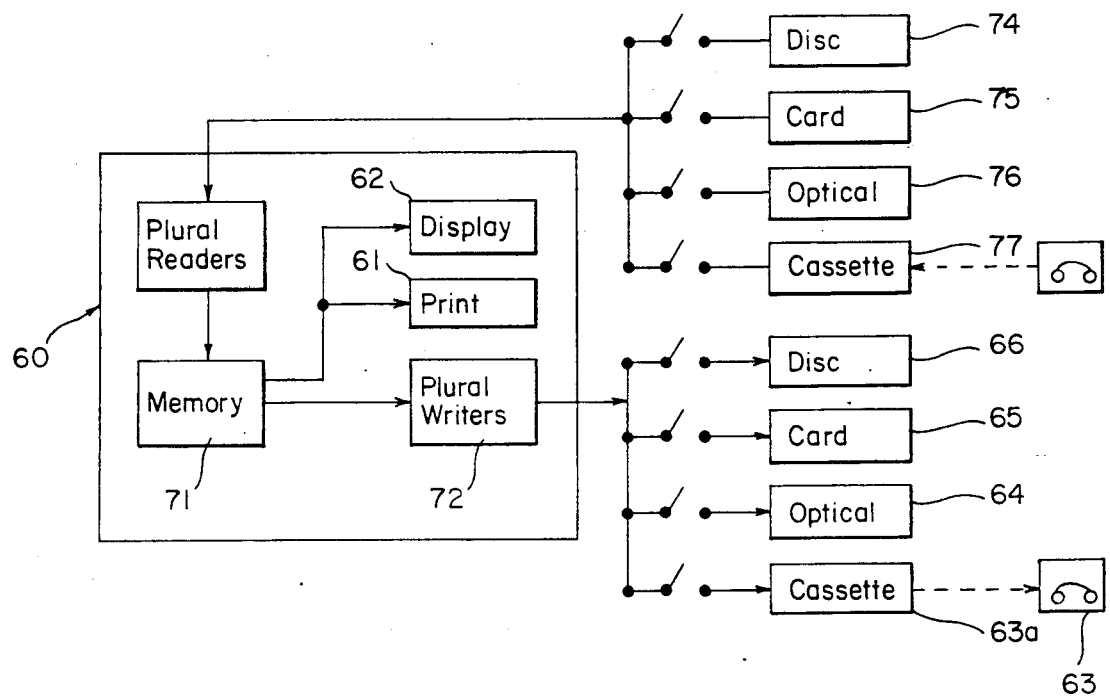
FIG. 3 is a simplified diagram illustrating the selective use of a common removable memory medium with different photocopiers, in the practice of the present invention.

According to an alternative embodiment of the invention, shown in FIG. 3, the photocopier 60 is provided with an internal memory 71, for receiving and storing one or more of the series of different image segments, or exerpts, as discussed above. However, in addition to such internal memory 71, the photocopier 60 is also provided with a supplemental memory writer unit 72 coupled to the internal memory 71, for detachably receiving a portable memory storage element, such as a portable magnetic video cassette 63. Any one or more of the stored image segments in the internal memory 71 can be read out to the supplemental memory unit 72 and recorded on the portable video cassette 63. The provision of the supplemental memory record unit 72 enables a user to obtain and store a series of different image segments at different times and at different locations, using different photocopier machines 60. For example, a person researching a given subject may consult a number of different libraries, or other sources, at different times, and locate a number of different documents that are desired to be retained. Each of these different documents can be photocopied at the library where found; and each one selectively transferred to that person's portable video cassette 63. Thus a user's personal video cassette 63 can be employed to sequentially receive recordings of a number of different documents, or image segments, and retain such recordings until such time as the user wishes to visually preview and/or record a composite image of all, or some of such series of different image segments.

In addition, each of said photocopiers 60 are also provided with a reader 77 for such portable video cassettes, to receive previously recorded video images from such cassette 63 and transfer such recorded images to the internal memory 71, through a coupling circuit, not shown. In the same manner as discussed above, any one of such photocopiers 60 can therefore be employed for visually previewing and/or printing of a composite image of a series of different image segments, that have been previously obtained by the user, and previously collected on the user's portable video cassette 63.

A number of different types of removable storage mediums may be employed in practising this embodiment of the invention, including magnetic disc recorders 66, various types of card memory recorders 65, optical memory card or disc recorders 64; as well as the magnetic video tape cassettes 63a discussed above in FIG. 3. If desired, the photocopiers 60 may alternatively be provided with more than one different type of such recorder, as shown, with the different types being selectively connected to the internal memory units 71 by appropriate switching means, such as 67 and 68, schematically shown in FIG. 3. It will be appreciated, however, that incorporating more than one type of writer-reader unit in each photocopier 60 materially adds to the cost of such machine, although providing greater versatility to a user.

Figure 4:
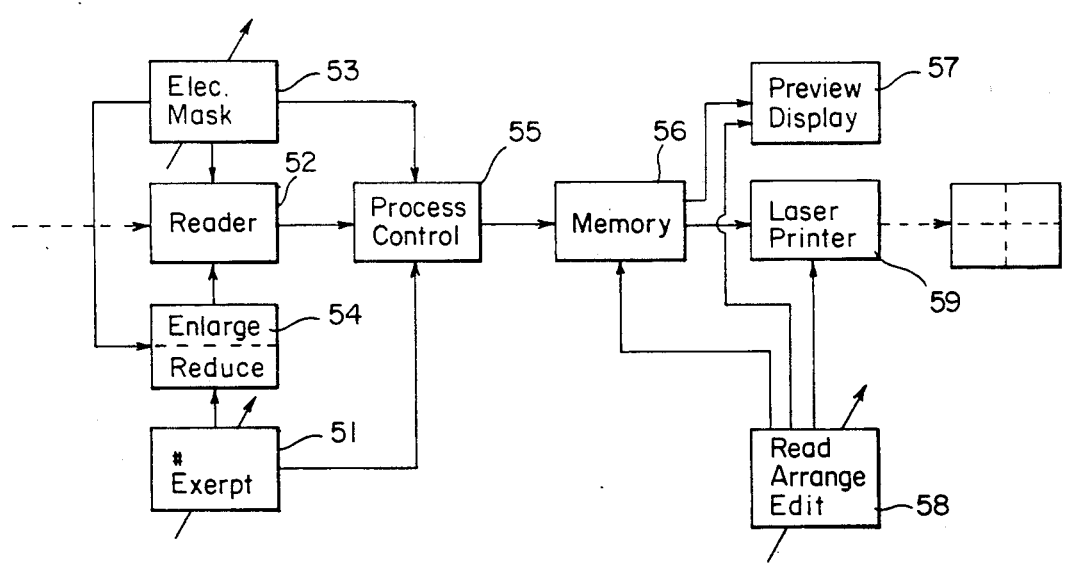
FIG. 4 is a block diagram showing further details of a portion of a preferred embodiment for electronic masking, editing, arranging, and manipulation of the image segments, and composite image.

FIG. 4 illustrates a further modification of the invention to enable a user to adjustably arrange, edit, and manipulate each of the different image segments, as well as editing, rearranging, and manipulating a composite image made up of a series of such image segments.

As shown in FIG. 4, there is provided an adjustable read-arrange-edit circuit 58, coupled to both the memory medium 56, the previewing display 57, and the laser printer 59. The read-arrange-edit circuit 58 permits a user to select any one of the previously recorded image segments, or image exerpts, that is stored in the memory 56 and to visually preview the selected segment on the display 57, where it can be edited, shifted, or otherwised manipulated or processed as desired, using the circuit 58. This processed image segment can then be returned to the memory 56 and stored, or it can be combined as a composite image with any others in the memory 56. A series of the recorded image segments can also be called up from the memory 56, and displayed as a composite image on the screen 57, where it can be additionally edited, rearranged, or otherwise manipulated or processed, and then returned to memory in changed form, or printed as a composite image on a copy sheet by laser printer 59.

By providing the read-arrange-edit circuitry 58 of FIG. 4, it is not necessary for a user to initially select or mask an original document in order to select the desired image segment therefrom. Instead, the entire original document may be read 52 by the photocopier and a video image thereof entered into the memory 56 for storage.

At a later time, at the convenience of the user, the entire image may be called up from the memory 56 and displayed on the screen of the previewer 57. At that time, the user can edit that document to delete any portions thereof that are not desired to be retained, leaving the desired image portions, or segments, to be returned and stored in the memory 56, for later use in composing the composite image, as discussed above. Alternatively, the user may employed a adjustable mask 53, associated with the reader 52, to initially select the desired portions of the document to be retained and stored in memory 56, and may selectively enlarge or reduce such image portions at 54, to obtain a desired image segment, for use in the composite image copy.

In the alternative embodiment of FIG. 4, the adjustable exerpt circuit 51, and process control circuit 55, function in the same general manner as discussed above. By use of such circuits, a user can call up from the memory 56 an adjustable number of different image segments or exerpts, and preview a composite image of such plural image segments on the visual display screen 57, or obtain a printed copy of such composite image, using the laser printer 59. Each such image segment can be individually enlarged or reduced, either manually or automatically, by circuit 54, in response to the number of different image segments selected by a user to be combined, using circuit 51, and in response to the size (length) of the copy sheet paper selected by the user, as discussed in FIG. 2. These enlargement-reduction adjustments permit each image segment to suitably conform with the spatial area allocated to it on the printed copy sheet, selected to be fed to the laser printer.

The masking of the original document at the reader 52, by adjustable mask 53, to select a desired image segment or image exerpt, may be performed using any of the masking techniques known in this art. For example, the entire video image from the reader 52 may be displayed on the screen 57, and an adjustable electronic editing circuit, or masking circuit 53, may be adjusted by a user to delete undesired portions of the displayed image, and retain the desired image segments or exerpts, in the memory 56. Alternatively, a more common adjustable mechanical mask may be employed at the reader station, to block the light beam scanning or reading of undesired portions of the original document, and generate a video image from only those portions that are to be retained. As a still further alternative, the entire original document may be viewed or scanned by the reader 52, and the entire video image thereof may be entered and stored in the memory. At a later time, more convenient to the user, this entire video image can be called up from the memory, and displayed and edited, using the adjustable read-arrange-edit circuit 58, and the desired image portions, or exerpts thereof, may be retained and stored in the memory 56, and the undesired portions thereof deleted and discarded.

Briefly recapitulating the structure and functioning of the embodiments of FIGS. 1, 2, and 4 above, a series of different original documents are sequentially applied to the photocopier, and each one, in turn, is viewed by the scanner or reader, to obtain a different video image corresponding thereto. The series of different images are stored in a memory, and are selectively read out, in groups of more than one, under selection by a user, and printed as a composite image on a copy sheet, and/or previewed in such groups on a display screen. Each of such original documents can be read and entered into the memory without change, and later edited, under control of a user to select a desired image segment or image exerpt from such document that is to be retained. Alternatively, such original documents may be adjustably masked, under control of a user, to initially select the desired image portions, or segments to be retained in the memory. Each such different image segment, is printed by the photocopier in a different spatial quadrant of the copy sheet, with all image segments being contiguous to each other on the copy sheet to form a composite image thereof. Each such image segment is centrally printed within its allocated spatial quadrant, and is manually or automatically enlarged or reduced in size to conform to the spatial area allocated to it on the copy sheet. Each such image segment can also be individually edited, shifted, manipulated, or otherwise processed, as desired by the user; or the entire composite image may be rearranged, or otherwise manipulated, or edited, under control of a user, to provide a desired composite copy of the selected group of different image segments or exerpts. A user can also select different ones, and different number groups of the image exerpts from the memory to be combined in the composite copy on the printed copy sheet. Still further, the user can select copy sheets of different length, and such selection controls the size of the different quadrants and spacing of the quadrants on the copy sheet, as well as the degree of enlargement or reduction in size of the image segments to conform with the number of image segments to be combined and with the size of the copy sheet. In the editing, shifting, manipulating, and otherwise processing of the image segments, to form the desired composite image thereof, the previewing image display of such segments is used, such that the user can observe such changes being made, as desired, before printing the composite copy. As shown in FIG. 3, the photocopier is also provided with a writer-reader for a removable storage or memory medium, such as for a portable magnetic video cassette. This enables a user to employ different photocopiers, at different locations, and at different times, for obtaining and storing the series of different image segments or image exerpts. This also enables the user to use any one of the different photocopiers for editing or otherwise processing the different ones of the image segments stored in the portable memory cassette. If desired, and if economically feasible, the photocopiers may be provided with more than one different kind of reader-writer, different types of removable and portable memory mediums, without restriction to one particular type of memory medium, for compiling and storing the series of different image segments or image exerpts.

It will be appreciated by those skilled in the photocopier field that a number of different types of readers or scanners may be used in practising the present invention; as well as various different types of printers, or print mechanisms for reproducing-printing the video image in the composite image form desired. For example, although laser printers are presently widely available, and quite versatile in use, electrostic, magnetic, thermal, and optical types are also available from different manufacturers for use in practising this invention. Either black and white, and color printers may be used, as may be the readers, scanners, memories, and other components. Similarly, the internal memories may employ floppy disc memory units, magnetic hard discs, solid state chip memory banks, as well as different kinds of optical disc, and various type of card units using storage mediums or microchips. For example, RAM microchips are presently available in large capacity of 4 megabit capacity, and soon in 16 megabit and larger. Similarly, hardware boards, firmware, and software packages are presently commercially available from a number of different manufacturers for image capture, image processing and manipulation, and for control of printers and displays. Such available boards and components can be incorporated for use in performing the different photocopying functions of the present invention. Thus the present invention may employ different, available kinds of components, in a series of new and different photocopying combinations.

I claim:

1. An interactive photocopier for electronically combining a manually selected number of separate image segments into a composite image, with the separate image segments being spatially arranged in the composite image under the manual control of a user, said photocopier having a memory for storing each of the separate image segments, and a visual display for previewing the separate image segments and for viewing said composite image, and said photocopier having manually controlled manipulating means for spatially adjusting the locations and angular orientations of the separate ones of the image segments in the composite image, said adjusting of the separate image segments being performed interactively by said user while being viewed on the display screen, thereby to provide the composite image in a composed arrangement selected and controlled by said user, said photocopier having printing means for printing said composite image, and said memory being detachably connectable to said photocopier and detachably connectable to other photocopiers, thereby to receive and store image segments from other photocopiers.

2. In the photocopier of claim 1, said manipulating means enabling said user to process said separate image segments under manual control of said user while interactively viewing said image segments on the visual display screen, and said manipulating means enabling said user to selectively process separate image segments in the composite image as well as selectively adjusting the location and spatial orientation of said separate image segments in the composite image.

3. In the photocopier of claim 1, said image processing including selectively reducing and enlarging individual ones of the separate image segments while being viewed on the screen by said user.

4. In the photocopier of claim 1, said photocopier having reading means for reading an original to be copied, and previewing said read original on said viewing screen, and said manipulating means enabling said user to selectively mask said original under manual control, thereby to obtain a desired one of the image segments.

5. A photocopier system having a plurality of photocopiers disposed at different locations, each photocopier having a removable portable memory unit for receiving and storing image segments read by any of said plurality of photocopiers, whereby said portable memory unit can store a plurality of image segments obtained from a plurality of different photocopiers, image processing means for at least one of said photocopiers, said image processing means including a visual display and image manipulating means, said image manipulating means being manually adjustable to enable a user to select given ones of the recorded image segments from the portable memory unit, and to combine said plural selected image segments to provide a composite image thereof, and said manipulating means being adjustable to enable said user to adjustably locate said image segments in the composite image, and arrange the spatial orientations thereof in said composite image, said visual display being coupled to the image manipulating means to display the plurality of image segments, and the composite image thereof during the manually controlled adjustment of the manipulating means.

6. In the photocopier system of claim 5, said manipulating means enabling said user to selectively mask an image stored on said portable memory unit, and to combine said masked image with the other image segments in the composite image.

7. In the photocopier system of claim 5, said image manipulating means including selectively reducing and enlarging one of the image segments.

8. In the photocopier system of claim 5, the addition of printing means for said photocopier for printing the composite image composed by said user from the plural image segments.

9. In the photocopier system of claim 5, all of said photocopiers in the system having visual display means for for previewing the images read by that photocopier and recorded on the portable memory unit.

10. A photocopier system having a plurality of photocopiers disposed at different locations, each photocopier having reading means for reading originals to be copied, each photocopier having recording means for recording the original to be copied on a removable memory unit, whereby said portable recording unit can store a plurality of images read by a plurality of different photocopiers, at least one of said photocopiers having image combining means, said image combining means including manually controlled image selection for enabling a user to select given ones of the images recorded on the memory unit to be combined, said image combining means including manually controlled image manipulation means for enabling a user to spatially position each of the selected images in a desired location of said combined image, and to spatially adjust the angular orientation of each selected image in the combined image, and visual display means associated with said image combining means for enabling said user to visually observe the location and orientation of each one of the selected images in the combined image.

11. In the photocopier system of claim 10, said manually controlled manipulating means enabling the user to selectively enlarge and reduce any of the images, and to selectively mask undesired portions of any of the images, and said visual display means interactively displaying the enlarging, reducing, and masking of any of the images.

12. An interactive photocopier for electronically combining a manually selected number of separate image segments into a composite image, with the separate image segments being spatially arranged in the composite image under the manual control of a user, said photocopier having a memory for storing each of the separate image segments, and a visual display for previewing the separate image segments and for viewing said composite image, and said photocopier having manually controllable manipulating means for spatially adjusting the locations and angular orientations of the separate ones of the image segments in the composite image, said adjusting of the separate image segments being performed interactively by said said user while being viewed on the display screen, thereby to provide the composite image in a composed arrangement selected and controlled by said user, said photocopier having printing means for printing said composite image, said memory being detachably connectable to said photocopier, and detachably connectable to other photocopiers, thereby to receive and store image segments from other photocopiers, said manipulating means enabling said user to process said separate image segments under manual control of said user while interactively viewing said image segments on the visual display screen, and said manipulating means enabling said user to selectively process image segments in the composite image as well as selectively adjusting the location and spatial orientation of the separate image segments in the composite image, said image processing including selectively reducing and enlarging individual ones of the separate image segments while being viewed on the screen by said user, said photocopier having reading means for reading an original to be copied, previewing the original on the visual display screen, and recording the original in said memory, and said manipulating means enabling said user to selectively mask said original under manual control of the user, while viewing the read original on the screen before and after masking.

* * * * *